(12) United States Patent
Fattal

(10) Patent No.: US 10,948,647 B2
(45) Date of Patent: Mar. 16, 2021

(54) UNIDIRECTIONAL GRATING-BASED BACKLIGHTING EMPLOYING A REFLECTIVE ISLAND

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 617 days.

(21) Appl. No.: 15/647,144

(22) Filed: Jul. 11, 2017

(65) Prior Publication Data

US 2017/0307800 A1 Oct. 26, 2017

Related U.S. Application Data

(63) Continuation of application No. PCT/US2015/011930, filed on Jan. 19, 2015.

(51) Int. Cl.
| | |
|---|---|
| *G02B 27/42* | (2006.01) |
| *F21V 8/00* | (2006.01) |
| *G02F 1/13357* | (2006.01) |
| *G02B 27/10* | (2006.01) |

(52) U.S. Cl.
CPC ......... *G02B 6/0038* (2013.01); *G02B 6/0055* (2013.01); *G02B 27/425* (2013.01); *G02B 6/0035* (2013.01); *G02B 6/0036* (2013.01); *G02B 27/1086* (2013.01); *G02F 1/133615* (2013.01); *G02F 2201/305* (2013.01)

(58) Field of Classification Search
CPC .. G02B 6/0036; G02B 6/0055; G02B 6/0035; G02B 6/0058
USPC ........................................................ 362/619
See application file for complete search history.

(56) References Cited

U.S. PATENT DOCUMENTS

| | | | |
|---|---|---|---|
| 5,615,024 A | 3/1997 | May et al. | |
| 5,617,248 A | 4/1997 | Takahashi et al. | |
| 5,721,598 A | 2/1998 | Smith | |
| (Continued) | | | |

FOREIGN PATENT DOCUMENTS

| | | |
|---|---|---|
| CN | 1213097 A | 4/1999 |
| CN | 1619373 A | 5/2005 |
| (Continued) | | |

OTHER PUBLICATIONS

International Search Report (ISR), 3 pages, from KIPO (ISA/KR), dated Oct. 19, 2015, for counterpart parent PCT patent application No. PCT/US2015/011930.

(Continued)

*Primary Examiner* — William J Carter
(74) *Attorney, Agent, or Firm* — J. Michael Johnson

(57) ABSTRACT

Unidirectional grating-based backlighting includes a light guide and a diffraction grating at a surface of the light guide. The light guide is to guide a light beam and the diffraction grating is configured to couple out a portion of the guided light beam using diffractive coupling and to direct the coupled-out portion away from the light guide surface as a primary light beam at a principal angular direction. The unidirectional grating-based backlighting further includes a reflective island in the light guide between the light guide surface and an opposite surface of the light guide to reflectively redirect a diffractively produced, secondary light beam out of the light guide in a direction of the primary light beam.

19 Claims, 4 Drawing Sheets

(56) References Cited

U.S. PATENT DOCUMENTS

| | | |
|---|---|---|
| 5,729,311 A | 3/1998 | Broer et al. |
| 5,926,294 A | 7/1999 | Sato et al. |
| 6,667,819 B2 | 12/2003 | Nishikawa et al. |
| 6,980,271 B2 | 12/2005 | Fujishiro |
| 7,742,120 B2 | 6/2010 | Bayley et al. |
| 7,773,849 B2 | 8/2010 | Shani |
| 7,903,332 B2 | 3/2011 | De Zwart et al. |
| 8,026,997 B2 | 9/2011 | Feng |
| 8,251,563 B2 | 8/2012 | Papakonstanitinou et al. |
| 8,619,363 B1 | 12/2013 | Coleman |
| 8,681,423 B1 | 3/2014 | Gibson et al. |
| 9,128,226 B2 | 9/2015 | Fattal et al. |
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 2002/0008834 A1 | 1/2002 | Suzuki |
| 2002/0075445 A1 | 6/2002 | Dabrowski et al. |
| 2002/0172031 A1 | 11/2002 | Masuda |
| 2003/0086649 A1 | 5/2003 | Zhou |
| 2004/0130879 A1 | 7/2004 | Choi et al. |
| 2004/0156182 A1 | 8/2004 | Hatjasalo et al. |
| 2004/0156589 A1 | 8/2004 | Gunn et al. |
| 2005/0007757 A1 | 1/2005 | Leu et al. |
| 2005/0041174 A1 | 2/2005 | Numata et al. |
| 2005/0073627 A1 | 4/2005 | Akiyama |
| 2005/0123229 A1 | 6/2005 | Huck |
| 2005/0140832 A1 | 6/2005 | Goldman et al. |
| 2005/0201122 A1 | 9/2005 | Shinohara et al. |
| 2005/0264717 A1 | 12/2005 | Chien et al. |
| 2006/0008347 A1 | 4/2006 | Winkler |
| 2006/0104570 A1 | 5/2006 | Rausch |
| 2007/0058394 A1 | 3/2007 | Yu |
| 2007/0064294 A1* | 3/2007 | Hoshino ............... G02B 5/0252 359/237 |
| 2007/0129864 A1 | 6/2007 | Tanaka et al. |
| 2007/0201246 A1* | 8/2007 | Yeo ...................... G02B 6/0051 362/627 |
| 2007/0213955 A1 | 9/2007 | Ishida et al. |
| 2007/0279367 A1 | 12/2007 | Kitai |
| 2007/0298533 A1 | 12/2007 | Yang et al. |
| 2008/0101088 A1 | 5/2008 | Kim et al. |
| 2008/0204663 A1 | 8/2008 | Balogh |
| 2008/0204873 A1 | 8/2008 | Daniell |
| 2008/0225393 A1 | 9/2008 | Rinko |
| 2008/0285307 A1 | 11/2008 | Aylward et al. |
| 2008/0285310 A1* | 11/2008 | Aylward ................ G02B 6/001 362/626 |
| 2008/0297696 A1 | 12/2008 | Banerjee |
| 2009/0091837 A1 | 4/2009 | Chao et al. |
| 2009/0129116 A1* | 5/2009 | Kim ..................... G02B 6/0035 362/606 |
| 2009/0190068 A1 | 7/2009 | Kawamura |
| 2009/0207342 A1 | 8/2009 | Yamaguchi et al. |
| 2009/0213300 A1 | 8/2009 | Daiku |
| 2009/0244706 A1 | 10/2009 | Levola et al. |
| 2009/0290837 A1 | 11/2009 | Chen et al. |
| 2009/0322986 A1 | 12/2009 | Wei et al. |
| 2010/0039832 A1 | 2/2010 | Ahlgren et al. |
| 2010/0103485 A1 | 4/2010 | Haussler |
| 2010/0118117 A1 | 5/2010 | Kroll et al. |
| 2010/0123952 A1 | 5/2010 | Chen et al. |
| 2010/0207964 A1 | 8/2010 | Kimmel et al. |
| 2010/0284085 A1 | 11/2010 | Laakkonen |
| 2010/0289870 A1 | 11/2010 | Leister |
| 2010/0302803 A1 | 12/2010 | Bita et al. |
| 2011/0002143 A1 | 1/2011 | Saarikko et al. |
| 2011/0141395 A1 | 6/2011 | Yashiro |
| 2011/0149596 A1 | 6/2011 | Lv et al. |
| 2011/0157257 A1 | 6/2011 | Bennett et al. |
| 2011/0157667 A1 | 6/2011 | Lacoste et al. |
| 2011/0182570 A1 | 7/2011 | Yeh |
| 2011/0241573 A1 | 10/2011 | Tsai et al. |
| 2011/0254916 A1 | 10/2011 | Fan et al. |
| 2011/0304784 A1 | 12/2011 | Hirota et al. |
| 2012/0008067 A1 | 1/2012 | Mun et al. |
| 2012/0013962 A1 | 1/2012 | Subbaraman et al. |
| 2012/0075698 A1 | 3/2012 | Minami |
| 2012/0113678 A1 | 5/2012 | Cornelissen et al. |
| 2012/0120213 A1 | 5/2012 | Ohyama et al. |
| 2012/0127547 A1 | 5/2012 | Gocho et al. |
| 2012/0127573 A1 | 5/2012 | Robinson et al. |
| 2012/0127751 A1 | 5/2012 | Kimmel |
| 2012/0176665 A1 | 7/2012 | Song et al. |
| 2012/0195072 A1 | 8/2012 | Minami |
| 2012/0249934 A1 | 10/2012 | Li et al. |
| 2012/0250141 A1 | 10/2012 | Chen |
| 2013/0057539 A1 | 3/2013 | Kim |
| 2013/0082980 A1 | 4/2013 | Gruhlke et al. |
| 2013/0201723 A1 | 8/2013 | Gourlay |
| 2014/0126239 A1 | 5/2014 | Huang et al. |
| 2015/0355403 A1 | 12/2015 | Santori et al. |
| 2016/0018582 A1 | 1/2016 | Fiorentino et al. |
| 2017/0090096 A1 | 3/2017 | Fattal |

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | 2000267041 A | 9/2000 |
| JP | 2002031788 A | 1/2002 |
| JP | 2004077897 A | 3/2004 |
| JP | 2004302186 A | 10/2004 |
| JP | 2007149356 A | 6/2007 |
| JP | 2008083532 A | 4/2008 |
| JP | 2008164963 A | 7/2008 |
| JP | 2009053499 A | 3/2009 |
| JP | 2009288718 A | 12/2009 |
| JP | 2010102188 A | 5/2010 |
| JP | 2010237416 A | 10/2010 |
| JP | 2011029161 A | 2/2011 |
| JP | 2011133677 A | 7/2011 |
| JP | 2011232717 A | 11/2011 |
| JP | 2012022085 A | 2/2012 |
| WO | 9908257 A1 | 2/1999 |
| WO | 2012069071 A1 | 5/2012 |

OTHER PUBLICATIONS

Travis et al, "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal, David et al, "A multi-directional backlight for a wide-angle, glasses-free three-dimensional display," Nature, Mar. 21, 2013, pp. 348-351, vol. 495, Macmillan Publishers Limited, 2013.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

* cited by examiner

UNIDIRECTIONAL GRATING-BASED BACKLIGHTING EMPLOYING A REFLECTIVE ISLAND

CROSS-REFERENCE TO RELATED APPLICATIONS

This application is a continuation application of and claims the benefit of priority to prior International Application No. PCT/US2015/011930, filed Jan. 19, 2015, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
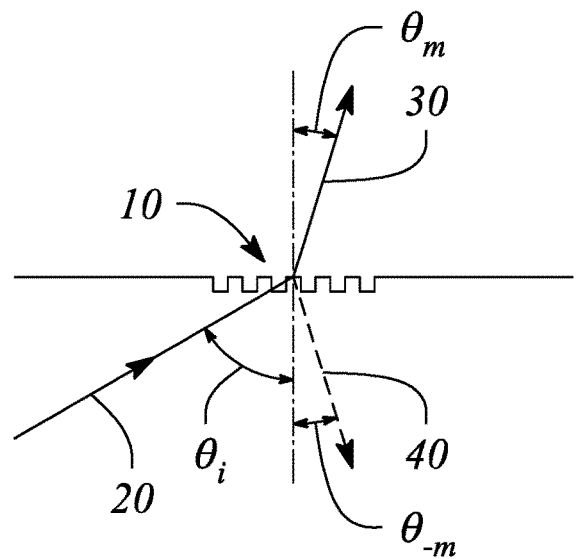
FIG. 1 illustrates a cross sectional view of a diffraction grating in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide electronic display backlighting using reflective redirection of secondary light beams. In particular, as described, unidirectional backlighting of an electronic display employs a diffraction grating to couple light out of a light guide and to direct the coupled-out light as a primary light beam in a viewing direction of the electronic display. In addition, a reflective island within the light guide is employed to reflectively redirect a diffractively produced, secondary light beam out of the backlight and in the viewing direction. In some embodiments, the primary light beam and the reflectively redirected, secondary light beam combine to yield a light beam that is brighter (i.e., having higher intensity) than either the primary light beam or the secondary light beam by itself. By enhancing the light intensity of the emitted light beam, the electronic display may exhibit improved efficiency, for example.

According to some embodiments, the coupled-out light that includes the primary light beam and the reflectively redirected, secondary light beam forms a plurality of light beams directed in the viewing direction. Moreover, the primary light beam in combination with the reflectively redirected, secondary light beam that forms a light beam of the coupled-out light may have a different principal angular directions from other coupled-out pairs of primary and secondary light beams, according to various embodiments of the principles described herein. In some embodiments, the plurality of light beams including pairs of primary and secondary light beams, forms or provides a light field in the viewing direction. In some embodiments, the primary and secondary light beam pairs having the different principal angular directions (also referred to as 'the differently directed' light beams or light beam pairs) may be employed to display three-dimensional (3-D) information. For example, the differently directed primary and secondary light beam pairs may be modulated and serve as pixels of a 'glasses free' 3-D electronic display.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some examples, the light guide may include a coating in addition to or instead of the aforementioned refractive index difference to further facilitate the total internal reflection. The coating may be a reflective coating, for example. According to various examples, the light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

According to various examples described herein, a diffraction grating (e.g., a multibeam diffraction grating) may be employed to scatter or couple light out of a light guide (e.g., a plate light guide) as a 'primary' light beam. In general, the diffraction grating also produces a 'secondary' light beam in addition to the primary light beam. While the primary light beam is directed or coupled out of the light guide, the secondary light beam produced diffractively is generally directed back into the light guide by the diffraction grating on or in the light guide, according to various examples. In particular, a diffraction angle $\theta_m$ of or provided by a locally periodic, transmissive diffraction grating at a surface of a light guide may be given by equation (1) as:

$$\theta_m = \sin^{-1}\left(\frac{m\lambda}{d} - n \cdot \sin\theta_i\right) \quad (1)$$

where $\lambda$ is a wavelength of the light, m is a diffraction order, d is a distance between features of the diffraction grating, $\theta_i$ is an angle of incidence of light on the diffraction grating, and n is a refractive index of a material on a side of the diffraction grating from which light is incident on the diffraction grating (i.e., 'light-incident' or light guide side). For simplicity, equation (1) assumes that a refractive index on a side of the diffraction grating opposite the light-incident or light guide side has a refractive index of one. In general, the diffraction order m is given by an integer that may be either positive or negative.

According to various examples, a diffraction angle $\theta_m$ of a primary light beam produced by the diffraction grating may be given by equation (1) where the diffraction order is positive (e.g., m>0), while a diffraction angle $\theta_m$ of a secondary light beam may have a negative diffraction order (e.g., m<0). As such and by definition herein, a 'primary light beam' may be defined as diffractively produced light beam having a positive diffraction order. Further, a 'secondary light beam' may be defined as a diffractively produced light beam having a negative diffraction order.

FIG. 1 illustrates a cross sectional view of a diffraction grating 10 in an example, according to an embodiment consistent with the principles described herein. For example, the diffraction grating 10 may be at a surface of a light guide. In addition, FIG. 1 illustrates a light beam 20 incident on the diffraction grating 10 at an incident angle $\theta_i$. A primary light beam 30 diffractively produced by the diffraction grating 10 and having a diffraction angle $\theta_m$ (or principal angular direction) is illustrated along with a secondary light beam 40 diffractively produced by the diffraction grating 10 and having a corresponding (albeit negative) diffraction angle $\theta_{-m}$, each as given by equation (1). As illustrated, the primary light beam 30 corresponds to a diffraction order 'm', while the secondary light beam 40 has a corresponding negative diffraction order '−m'.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light of the primary and secondary light beams) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide (e.g., as in the case of the primary light beams) as well as diffractively produce corresponding light directed into the light guide (e.g., as in the case of the secondary light beams).

Further, by definition herein, the features of a diffraction grating are referred to as 'diffractive features' and may be one or more of at, in and on a surface (i.e., a boundary between two materials). The surface may be a surface of a plate light guide, for example. The diffractive features may include any of a variety of structures that diffract light including, but not limited to, one or more of grooves, ridges, holes and bumps at, in or on the surface. For example, the diffraction grating may include a plurality of parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces diffractively redirected light (e.g., diffractively coupled-out light) that includes a plurality of primary light beams. Further, the primary light beams of the plurality produced by the multibeam diffraction grating have different principal angular directions from one another, by definition herein. The multibeam diffraction grating may also diffractively produce a plurality of secondary light beams. The secondary light beams produced by the multibeam diffraction grating generally correspond to the primary light beams and have corresponding different principal angular directions. In particular, by definition, a light beam of the primary (or secondary) light beam plurality has a predetermined principal angular direction that is different from another light beam of the primary (or secondary) light beam plurality as a result of diffraction of incident light by the multibeam diffraction grating. For example, the primary light beam plurality may include eight light beams that have eight different principal angular directions. The eight light beams in combination may represent a light field, for example. Further, there may be a set of eight secondary light beams produced by the multibeam diffraction grating, wherein the eight secondary light beams also have eight different principal angular directions. Moreover, a secondary light beam may correspond to (i.e., have a principal angular direction that is related to) a light beam of the primary light beam plurality, and the secondary light beams (when reflectively redirected as described below) may combine with the corresponding primary light beams as part of, or to augment, the light field. According to various examples, the different principal angular directions of the various primary and secondary light beams are determined by a combination of a grating pitch or spacing and an orientation or rotation of the diffractive features of the multibeam diffraction grating at the points of origin of the respective light beams relative to a propagation direction of the light incident on the multibeam diffraction grating.

According to various embodiments described herein, a diffraction grating (e.g., a multibeam diffraction grating) is employed to produce coupled-out light that represents a pixel of an electronic display. In particular, a primary light beam produced by the diffraction grating by diffractively coupling light out of the light guide may represent or correspond to a pixel of the electronic display. In addition, diffractively produced secondary light beams that are reflectively redirected may also contribute to the electronic display pixels. In particular, the light guide and the diffraction grating (i.e., the multibeam diffraction grating) may be part of a backlight of or used in conjunction with an electronic display such as, but not limited to, a 'glasses free' three-dimensional (3-D) electronic display (e.g., also referred to as a multiview or 'holographic' electronic display or an autostereoscopic display). As such, the differently directed light beams produced from the light guide by diffraction using the multibeam diffractive grating may be or represent 'pixels' of the 3-D electronic display.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light).

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 2A:
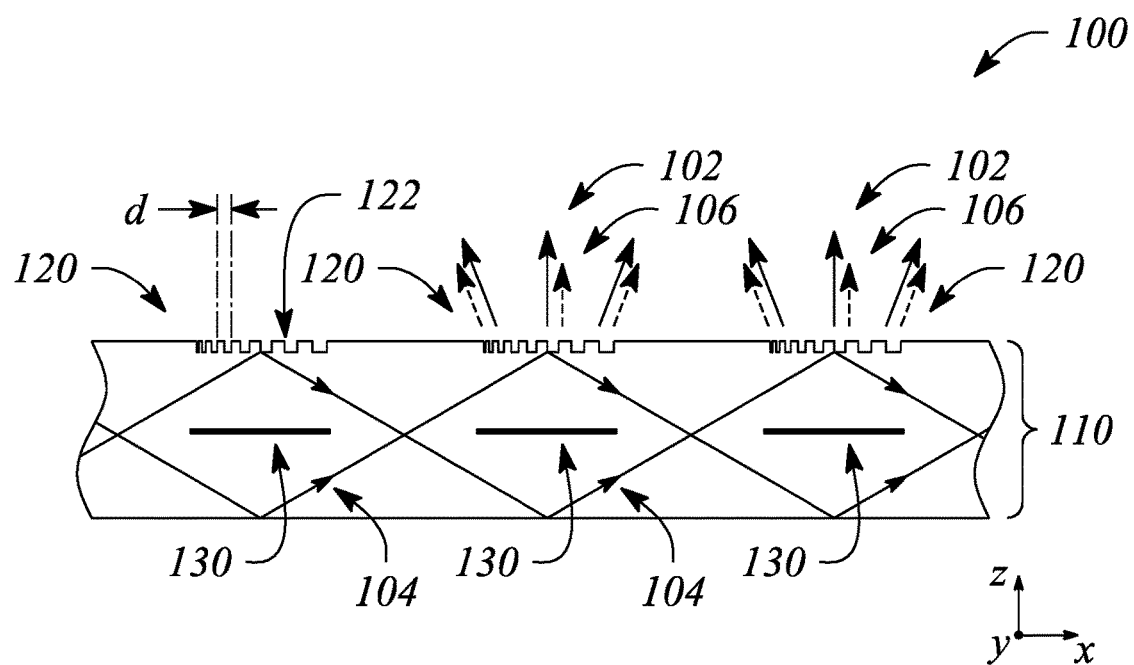
FIG. 2A illustrates a cross sectional view of a unidirectional grating-based backlight in an example, according to an embodiment consistent with the principles described herein.
Figure 2B:
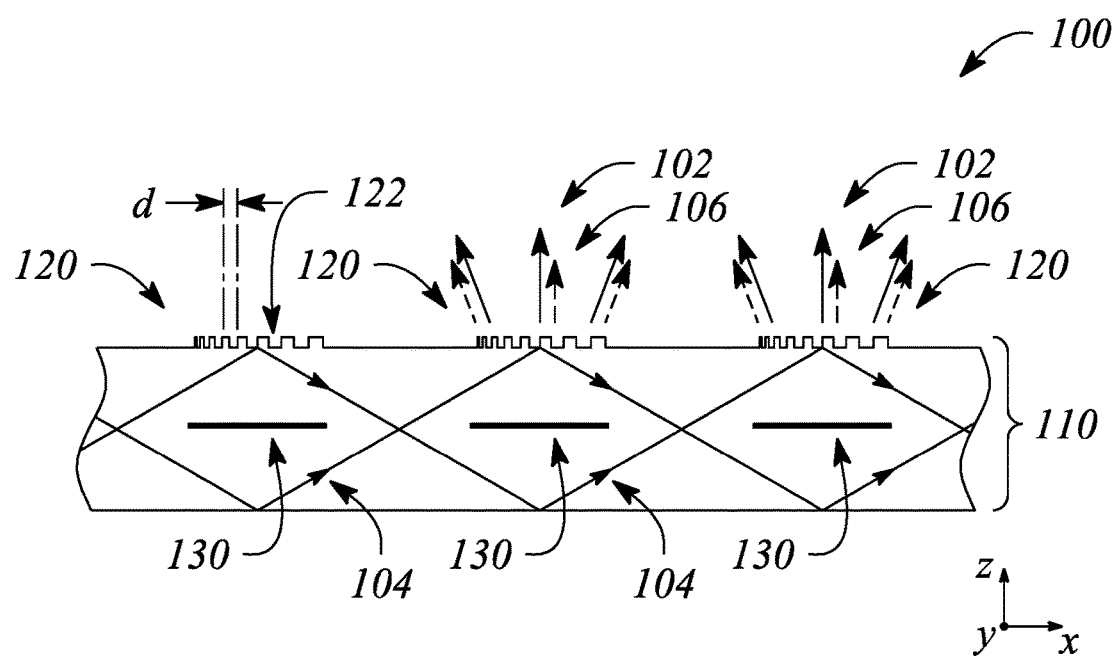
FIG. 2B illustrates a cross sectional view of a unidirectional grating-based backlight in an example, according to another embodiment consistent with the principles described herein.
Figure 2C:
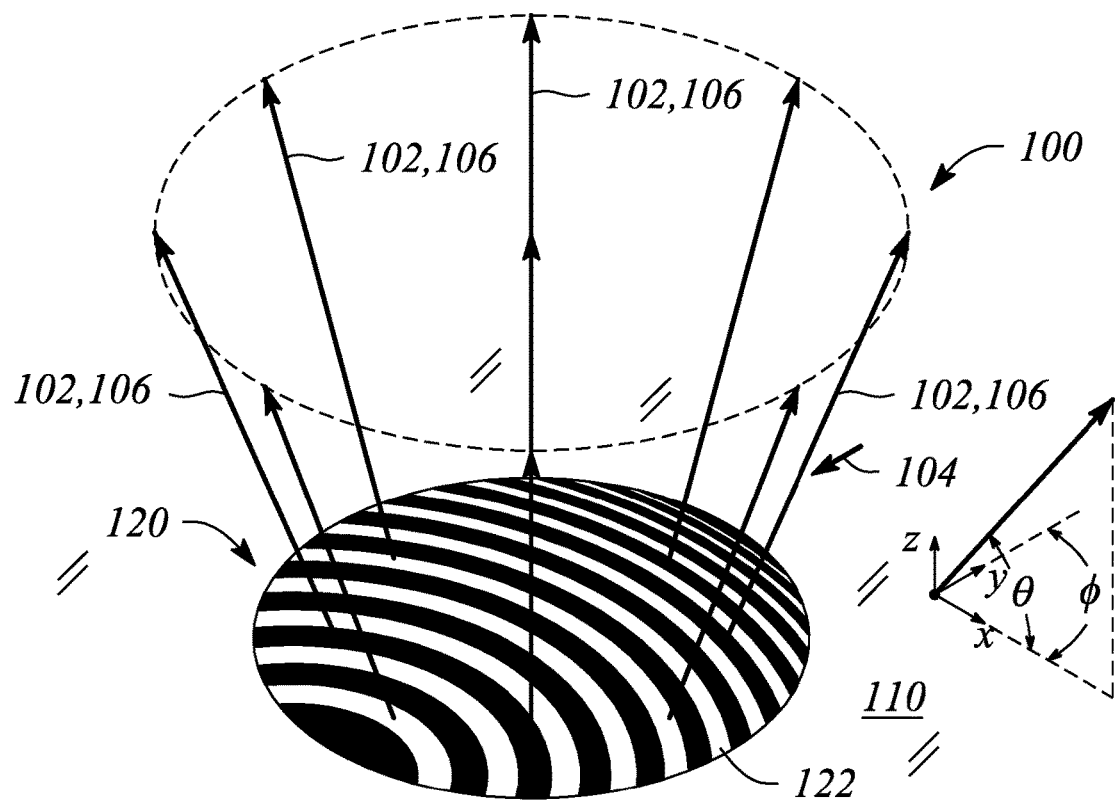
FIG. 2C illustrates a perspective view of a unidirectional grating-based backlight in an example, according to an embodiment consistent with the principles described herein.

In accordance with some embodiments of the principles described herein, a unidirectional grating-based backlight is provided. FIG. 2A illustrates a cross sectional view of a unidirectional grating-based backlight 100 in an example, according to an embodiment consistent with the principles described herein. FIG. 2B illustrates a cross sectional view of a unidirectional grating-based backlight 100 in an example, according to another embodiment consistent with the principles described herein. FIG. 2C illustrates a perspective view of a unidirectional grating-based backlight 100 in an example, according to an embodiment consistent with the principles described herein. According to various embodiments, reflective redirection of diffractively produced, secondary light beams augments or adds to an intensity of emitted light beams (e.g., a light field) to increase a brightness of the unidirectional grating-based backlight 100. The increased brightness may improve an efficiency of the unidirectional grating-based backlight 100, according to various embodiments.

For example, diffractive out-coupling of light from the unidirectional grating-based backlight 100 may be used to form or provide a plurality of primary light beams 102 directed away from a surface of the unidirectional grating-based backlight 100 to form a light field, as illustrated in FIGS. 2A-2C. The diffractively coupled-out light is a portion of guided light 104 within the unidirectional grating-based backlight 100. Diffraction that provides the diffractive coupling out of light also diffractively produces secondary light beams. Reflective redirection of the secondary light beams may add to or augment a light intensity of the primary light beams 102, according to various embodiments.

In particular, the primary light beams 102 may be combined with the reflectively redirected, secondary light beams 106 (illustrated as dashed arrows) to form or provide the light field of the unidirectional grating-based backlight 100. Further, a light beam 102 and a corresponding reflectively redirected, secondary light beam 106 provided by the unidirectional grating-based backlight 100 may be configured to have a different principal angular direction from other primary light beams 102 and other reflectively redirected, secondary light beams 106, respectively, according to some embodiments. In some examples, the primary light beams 102 and the reflectively redirected, secondary light beams 106 may have both a predetermined direction (principal angular direction) and a relatively narrow angular spread within the light field.

In some embodiments, the unidirectional grating-based backlight 100 may be a light source or 'backlight' of an electronic display. In particular, according to some embodiments, the electronic display may be a so-called 'glasses free' three-dimensional (3-D) electronic display (e.g., a multiview display or autostereoscopic display) in which the various light beams 102, 106 correspond to or represent pixels associated with different 'views' of the 3-D display. Augmentation of the light intensity of light produced by the unidirectional grating-based backlight 100 may increase a brightness of the electronic display (e.g., the 3-D electronic display). For example, the principal angular directions of the primary light beams 102 may be substantially similar relative to the principal angular directions of the reflectively redirected, secondary light beams 106. Thus, the primary light beams 102 and the corresponding reflectively redirected, secondary light beams 106 may be substantially co-directed or have substantially the same principal angular direction and further, the principal angular direction may correspond to an angular direction of a particular view of the 3-D electronic display, for example. As a result, the primary and secondary light beams 102, 106 in combination may represent or correspond to a pixel (or equivalently a view) of the 3-D electronic display, according to some examples. Moreover, the pixels corresponding to the combination of the primary and secondary light beams 102, 106 will be brighter than a pixel that included only the primary light beams 102, for example.

In some embodiments, the combined primary and secondary light beams 102, 106 may be modulated (e.g., by a light valve as described below). Modulation of different sets of combined light beams 102, 106 directed in different angular directions away from the unidirectional grating-based backlight 100 may be particularly useful for dynamic 3-D electronic display applications, for example. That is, the different sets of modulated light beams 102, 106 directed in particular view directions may represent dynamic pixels of the 3-D electronic display corresponding to the particular view directions.

As illustrated in FIGS. 2A-2C, the unidirectional grating-based backlight 100 comprises a light guide 110. In particular, the light guide 110 may be a plate light guide 110, according to some embodiments. The light guide 110 is configured to guide light from a light source (not illustrated in FIGS. 2A-2C) as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light from the light source is guided as a beam of light 104 along a length of the light guide 110. Further, the light guide 110 may be configured to guide the light (i.e., the guided light beam 104) at a non-zero propagation angle. The guided light beam 104 may be guided (e.g., as the light beam) at the non-zero propagation angle within the light guide 110 using total internal reflection, for example.

The non-zero propagation angle is defined herein as an angle relative to a surface (e.g., a top surface or a bottom surface) of the light guide 110. In some examples, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, the light from the light source is introduced or coupled into the light guide 110 at the non-zero propagation angle (e.g., about 30-35 degrees). One or more of a lens, a mirror or similar reflector (e.g., a tilted collimating reflector), and a prism (not illustrated) may facilitate coupling light into an input end of the light guide 110 as the beam of light at the non-zero propagation angle. Once coupled into the light guide 110, the guided light beam 104 propagates along the light guide 110 in a direction that is generally away from the input end (e.g., along an x-axis as illustrated in FIGS. 2A-2B). Further, the guided light beam 104 propagates by reflecting or 'bouncing' between the top surface and the bottom surface of the light guide 110 at the non-zero propagation angle (e.g., illustrated by an extended, angled arrow representing a light ray of the guided light beam 104).

The guided light beam 104 produced by coupling light into the light guide 110 may be a collimated light beam, according to some examples. In particular, by 'collimated light beam' it is meant that rays of light within the guided light beam 104 are substantially parallel to one another within the guided light beam 104. Rays of light that diverge or are scattered from the collimated light beam of the guided light beam 104 are not considered to be part of the collimated light beam, by definition herein. Collimation of the light to produce the collimated guided light beam 104 may be provided by the lens or mirror (e.g., tilted collimating reflector, etc.) used to couple the light into the light guide 110, for example.

In some examples, the light guide 110 (e.g., as a plate light guide 110) may be a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

According to various embodiments, the unidirectional grating-based backlight 100 further includes a diffraction grating 120. In some examples, the diffraction grating 120 may be located at a surface (e.g., a front surface or the top surface) of the light guide 110, e.g., as illustrated in FIGS. 2A-2B. In other examples (not illustrated), the diffraction grating 120 may be located within the light guide 110. The diffraction grating 120 is configured to diffractively scatter or couple out a portion of the guided light beam 104 as a primary light beam 102. The diffraction grating 120 is further configured to direct the primary light beam 102 away from the light guide surface at a predetermined principal angular direction. The principal angular direction of the primary light beam 102 has an elevation angle and an azimuth angle. Further, according to various examples, the diffraction grating 120 is configured to diffractively produce a secondary light beam, as further described below, from another portion of the guided light beam 104. The diffractively produced, secondary light beam may be directed into the light guide 110 (e.g., as opposed to being coupled out of the light guide 110) at a negative principal angular direction corresponding to the predetermined principal angular direction the primary light beam 102.

According to various embodiments, the diffraction grating 120 comprises a plurality of diffractive features 122 that are configured to provide diffraction. The provided diffraction is responsible for the diffractive coupling of the portion of the guided light beam 104 out of the light guide 110 as the primary light beam 102. For example, the diffraction grating 120 may include one or both of grooves in a surface of the light guide 110 and ridges protruding from the light guide surface that serve as the diffractive features 122. The grooves and ridges may be arranged parallel or substantially parallel to one another and, at least at some point, perpendicular to a propagation direction of the guided light beam 104 that is to be coupled out by the diffraction grating 120.

In some examples, the grooves or ridges may be etched, milled or molded into the surface or applied on the surface. As such, a material of the diffraction grating 120 may include a material of the light guide 110. As illustrated in FIG. 2A, for example, the diffraction grating 120 comprises substantially parallel grooves formed in the surface of the light guide 110. In FIG. 2B, the diffraction grating 120 comprises substantially parallel ridges that protrude from the light guide surface. In other examples (not illustrated), the diffraction grating 120 may comprise a film or layer applied or affixed to the light guide surface.

When the diffraction grating 120 is a member of a plurality of diffraction gratings 120, the plurality of diffraction gratings 120 may be arranged in a variety of configurations at, on or in the surface of the light guide 110, according to various examples. For example, the plurality of diffraction gratings 120 may be arranged in columns and rows across the light guide surface (e.g., as an array). In another example, the plurality of diffraction gratings 120 may be arranged in groups (e.g., a group of three gratings, each grating in the group being associated with a different color of light) and the groups may be arranged in rows and columns. In yet another example, the plurality of diffraction gratings 120 may be distributed substantially randomly across the surface of the light guide 110.

According to some embodiments, the diffraction grating 120 is or comprises a multibeam diffraction grating 120. The multibeam diffraction grating 120 is configured to couple out a portion of the guided light beam 104 from the light guide 110 by or using diffractive coupling (e.g., also referred to as 'diffractive scattering'), according to various embodiments. For example, the portion of the guided light beam 104 may be diffractively coupled out by the multibeam diffraction grating 120 through the light guide surface (e.g., through the top surface of the light guide 110) as a plurality of the primary light beams 102 (e.g., as illustrated in FIGS. 2A and 2B). Further, the plurality of primary light beams 102 coupled out by the multibeam diffraction grating 120 is directed away from the light guide surface by the multibeam diffraction grating 120. According to various embodiments, a primary light beam 102 of the primary light beam plurality has a different principal angular direction from other primary light beams 102 of the primary light beam plurality. Together, the plurality of primary light beams 102 coupled out by the multibeam diffraction grating 120 form a light field of the unidirectional grating-based backlight 100, according to various embodiments.

Further, the multibeam diffraction grating 120 may produce a plurality of the secondary light beams due to diffraction of another portion of the guided light beam 104. In general, the diffractively produced, secondary light beams are initially directed away from the multibeam diffraction grating 120 and into the light guide 110 in different principal angular directions from one another of the secondary light beam plurality. The principal angular directions of the diffractively produced, secondary light beams have respective elevation angles and azimuth angles. In particular, an elevation angle of a principal angular direction of a particular secondary light beam may be substantially equal in magnitude, but opposite in sign, to an elevation angle of the principal angular direction of a corresponding primary light beam 102 of the primary light beam plurality. Additionally, an azimuth angle of the principal angular direction of the particular secondary light beam may be substantially equal to an azimuth angle of the corresponding primary light beam principal angular direction (e.g., see FIG. 1). For example, a primary light beam 102 with an elevation angle of sixty degrees (60°) and an azimuth angle of ten degrees (10°) may have a corresponding diffractively produced, secondary light beam having an elevation angle of minus sixty degrees (−60°) and an azimuth of ten degrees (10°).

According to various examples, the multibeam diffraction grating 120 may comprise a chirped diffraction grating 120. By definition, the 'chirped' diffraction grating 120 is a diffraction grating exhibiting or having a diffraction spacing of the diffractive features that varies across an extent or length of the chirped diffraction grating 120, e.g., as illustrated in FIGS. 2A and 2B. Herein, the varying diffraction spacing is referred to as a 'chirp'. As a result, the portion of the guided light beam 104 that is diffractively coupled out of the light guide 110 exits or is emitted from the chirped diffraction grating 120 as the primary light beam 102 at different diffraction angles corresponding to different points of origin across the chirped diffraction grating 120. Similarly, diffractively produced, secondary light beams exit from the chirped diffraction grating 120 at different diffraction angles also corresponding to the different points of origin. By virtue of a predefined chirp, the chirped diffraction grating 120 is responsible for the predetermined and different principal angular directions of the coupled-out, primary light beams 102 as well as the diffractively produced, secondary light beams.

In FIGS. 2A-2C, the multibeam diffraction grating 120 is a chirped diffraction grating 120. In particular, as illustrated, the diffractive features 122 are closer together at a first end (e.g., closer to the input end of the light guide 110) of the multibeam diffraction grating 120 than at a second end. Further, the diffractive spacing d of the illustrated diffractive features 122 varies from the first end to the second end. In some examples, the chirped diffraction grating 120 may have or exhibit a chirp of the diffractive spacing d that varies linearly with distance (e.g., see FIGS. 2A-2C). As such, the chirped diffraction grating 120 may be referred to as a 'linearly chirped' diffraction grating, as illustrated.

In another example (not illustrated), the chirped diffraction grating 120 may exhibit a non-linear chirp of the diffractive spacing d. Various non-linear chirps that may be used to realize the chirped diffraction grating 120 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

In some examples, the primary light beams 102 produced by coupling light out of the light guide 110 using the multibeam diffraction grating 120 may diverge (i.e., be diverging light beams 102) when the guided light beam 104 propagates in the light guide 110 in a direction from the first end of the multibeam diffraction grating 120 to the second end of the multibeam diffraction grating 120 (e.g., from left to right, as illustrated in FIG. 2A). Alternatively, converging primary light beams 102 may be produced when the guided light beam 104 propagates in the reverse direction in the light guide 110, i.e., from the second end to the first end of the multibeam diffraction grating 120, according to other examples (not illustrated). Similarly, the diffractively produced, secondary light beams (not illustrated in FIGS. 2A-2C) may be correspondingly either generally diverging or generally converging (albeit in a direction that is generally into the light guide 110).

Referring to FIG. 2C, the multibeam diffraction grating 120 may include diffractive features 122 (e.g., grooves or ridges) in, at or on the surface of the light guide 110 that are both chirped and curved. The guided light beam 104 has an incident direction relative to the multibeam diffraction grating 120 and the light guide 110, as illustrated by a bold arrow labeled 104 in FIG. 2C. Also illustrated is the plurality of coupled-out or emitted primary light beams 102 pointing away from the multibeam diffraction grating 120 at the surface of the light guide 110. The illustrated primary light beams 102 are emitted in a plurality of predetermined different principal angular directions. In particular, the predetermined different principal angular directions of the emitted primary light beams 102 are different in both azimuth and elevation (e.g., to form a light field), as illustrated. According to various examples, both the predefined chirp of the diffractive features 122 and the curve of the diffractive features 122 may be responsible for the predetermined different principle angular directions of the emitted primary light beams 102.

For example, due to the curve, the diffractive features 122 within the multibeam diffraction grating 120 may have varying orientations relative to an incident direction of the guided light beam 104. In particular, an orientation of the diffractive features 122 at a first point or location within the multibeam diffraction grating 120 may differ from an orientation of the diffractive features 122 at another point or location. With respect to the coupled-out or emitted light beam 102, an azimuthal component $\phi$ of the principal angular direction $\{\theta, \phi\}$ of the primary light beam 102 (as well as that of the secondary light beam) may be determined by or correspond to the azimuthal orientation angle $\phi_f$ of the diffractive features 122 at a point of origin of the light beam 102 (i.e., at a point where the incident guided light 104 is coupled out), according to some examples. As such, the varying orientations of the diffractive features 122 within the multibeam diffraction grating 120 produce different primary light beams 102 and corresponding secondary light beams having different principle angular directions $\{\theta, \phi\}$, at least in terms of their respective azimuthal components $\phi$.

In particular, at different points along the curve of the diffractive features 122, an 'underlying diffraction grating' of the multibeam diffraction grating 120 associated with the curved diffractive features 122 has different azimuthal orientation angles $\phi_f$. Thus, at a given point along the curved diffractive features 122 the curve has a particular azimuthal orientation angle $\phi_f$ that generally differs from another point along the curved diffractive features 122. Further, the particular azimuthal orientation angle $\phi_f$ results in a corresponding azimuthal component $\phi$ of a principal angular direction $\{\theta, \phi\}$ of a primary light beam 102 emitted from the given point. In some examples, the curve of the diffractive features (e.g., groove, ridge, etc.) may represent a section of a circle. The circle may be coplanar with the light guide surface. In other examples, the curve may represent a section of an ellipse or another curved shape, e.g., that is coplanar with the light guide surface.

In other examples, the multibeam diffraction grating 120 may include diffractive features 122 that are 'piecewise' curved. In particular, while the diffractive feature may not describe a substantially smooth or continuous curve per se, at different points along the diffractive feature within the multibeam diffraction grating 120, the diffractive feature still may be oriented at different angles with respect to the incident direction of the guided light beam 104. For example, the diffractive feature 122 may be a groove including a plurality of substantially straight segments, each segment having a different orientation than an adjacent segment. Together, the different angles of the segments may approximate a curve (e.g., a segment of a circle), according to various examples. In yet other examples, the diffractive features 122 may merely have different orientations relative to the incident direction of the guided light beam 104 at different locations within the multibeam diffraction grating 120 without approximating a particular curve (e.g., a circle or an ellipse).

As illustrated in FIGS. 2A and 2B, the unidirectional grating-based backlight 100 further comprises a reflective island 130. The reflective island is located between a front surface and a back surface (i.e., opposite surfaces) of the light guide 110, according to various embodiments. In some embodiments, the reflective island 130 is both located within the light guide 110 (i.e., between the front and back surfaces) and explicitly spaced apart from the front and back surfaces.

The reflective island 130 is configured to reflectively redirect a secondary light beam that is diffractively produced by the diffraction grating 120, according to various embodiments. In particular, the reflective island 130 is configured to reflectively redirect the diffractively produced, secondary light beam in a direction of or corresponding to the coupled-out primary light beam 102. Reflective redirection by the reflective island 130 results in or produces a reflectively redirected, secondary light beam 106 that may exit the light guide 110 (e.g., through the diffraction grating 120), as illustrated in FIGS. 2A-2B using dashed lines to distinguish from the primary light beams 102.

In some embodiments, the reflective island 130 is a metal island 130 comprising a reflective metal layer. The metal layer may include a reflective or 'polished' metal such as, but not limited to, silver, gold, aluminum, nickel, chromium, or various combinations or alloys thereof. In other examples, the reflective island 130 may include another reflective island structure or layer including, but not limited to, a Bragg mirror island or more specifically a distributed Bragg reflector (DBR) island. According to some embodiments, the metal layer or other reflective island structure may be deposited (e.g., using vacuum deposition) or otherwise provided on a layer of the light guide 110. Additional material of the light guide 110 may then be added (e.g., deposited, laminated, etc.) on top of the deposited metal island layer or other reflective island structure to position the reflective island 130 within the light guide 110 between the front and back surfaces thereof.

By definition herein, the reflective island 130 is a discrete reflective structure or layer having a length and a width that are less than a length and a width of the light guide 110. In particular, the reflective island 130 is not a continuous film or layer within the light guide 110, e.g., with respect to the propagation direction of the guided light beam 104, as indicated by the use of the term 'island'. Instead, the reflective island 130 has a finite length and a finite width that are less than, and in some examples, much less than, one or both of the length and the width of the light guide 110. In some embodiments, an extent or size of the reflective island 130 is about equal to an extent or size of the diffraction grating 120. In some embodiments, the reflective island 130 may be laterally aligned with the diffraction grating 120. For example, the light guide 110 may be a plate light guide 110 with the diffraction grating 120 on the front surface and the reflective island 130 located below (e.g., spaced from) and laterally aligned with the diffraction grating 120 in a plane parallel to the front surface, as illustrated in FIGS. 2A and 2B. For example, the diffraction grating 120 and the reflective island 130 may be vertically aligned or 'vertically stacked,' as illustrated. In addition, the reflective island 130 may be about the same size as the overlying diffraction grating 120, as illustrated in FIGS. 2A-2B, by way of example.

According to some embodiments, a distance between the diffraction grating 120 and the reflective island 130 (e.g., a vertical distance or separation distance) is selected to facilitate propagation of the guided light beam 104 within the light guide 110. For example, when the reflective island size is about equal to the diffraction grating size and the guided light beam 104 is configured to propagate at a non-zero propagation angle γ, the separation distance h between the diffraction grating 120 and the reflective island 130 may be selected to be about equal to one half of a grating pitch P multiplied by a tangent of the non-zero propagation angle γ. Specifically, the separation distance h may be given by equation (2) as $$h \cong \frac{P}{2} \cdot \tan(\gamma) \quad (2)$$

where the grating pitch P is a lateral (e.g., horizontal) spacing between the diffraction grating 120 and an adjacent (e.g., preceding) diffraction grating 120.

Figure 3:
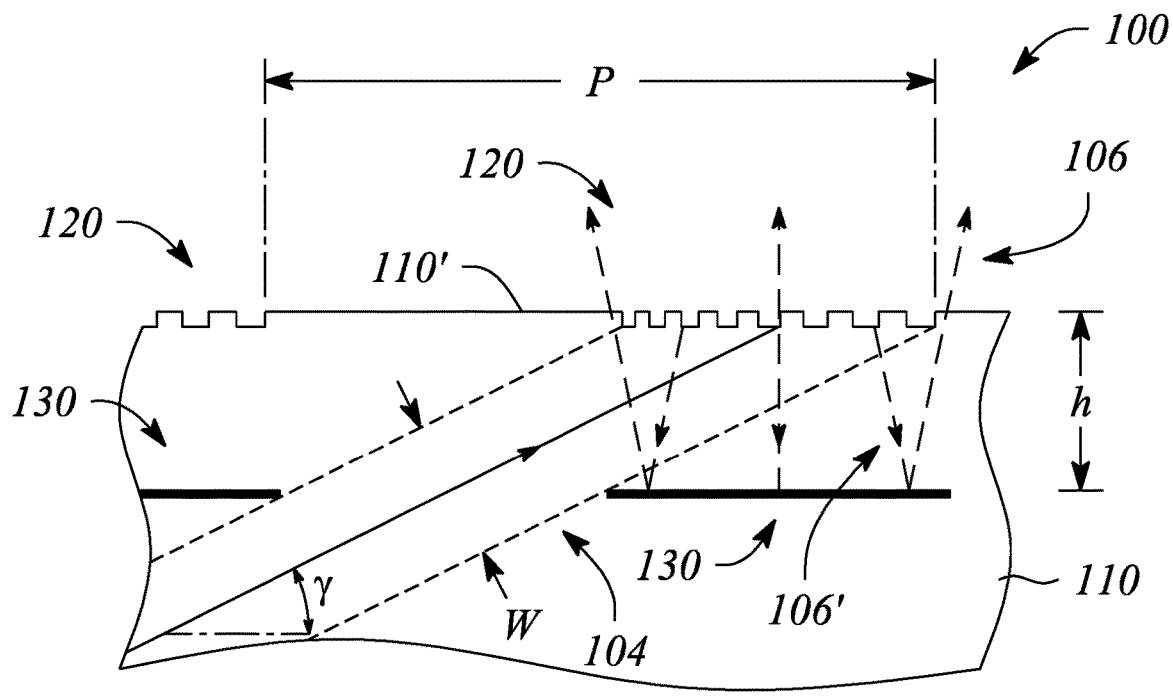
FIG. 3 illustrates a cross sectional view of a portion of a unidirectional grating-based backlight depicting a geometry associated with facilitating propagation of a guided light beam in an example, according to an embodiment consistent with the principles described herein.

FIG. 3 illustrates a cross sectional view of a portion of a unidirectional grating-based backlight 100 depicting a geometry associated with facilitating propagation of a guided light beam 104 in an example, according to an embodiment consistent with the principles described herein. In particular, FIG. 3 illustrates a portion of a pair of diffraction gratings 120 at a front surface 110' of the light guide 110 and a portion of a pair of reflective islands 130 aligned below each of the diffraction gratings 120, as illustrated. Also illustrated in FIG. 3 by an elongated arrow bounded by a pair of dashed lines is a guided light beam 104 having a non-zero propagation angle γ. The dashed lines on either side of the elongated arrow illustrate an extent or beamwidth W of the guided light beam 104. By selecting the separation distance h between the diffraction gratings 120 and the associated reflective islands 130 according to equation (2) using the grating pitch P, the beamwidth W of the guided light beam 104, as delineated by a space between the two reflective islands 130, may be wide enough to fully illuminate the diffraction grating 120, as illustrated. Also illustrated in FIG. 3 are the reflectively redirected, secondary light beams 106 originating at a surface of a reflective island 130. In particular, the reflectively redirected, secondary light beams 106 are the result of reflection of diffractively produced, secondary light beams 106' at the reflective island surface. The primary light beams 102 are not illustrated in FIG. 3 for ease and clarity of the illustration only.

The unidirectional grating-based backlight 100 may further include the light source (not illustrated in FIGS. 2A-2C and 3), according to some embodiments. The light source may be configured to provide light that, when coupled into the light guide 110, is the guided light beam 104. In various embodiments, the light source may be substantially any source of light including, but not limited to, the light sources listed above, e.g., one or more of a light emitting diode (LED), a fluorescent light and a laser. In some examples, the light source may produce a substantially monochromatic light having a narrowband spectrum denoted by a particular color. In other examples, the light provided by the light source has a substantially broadband spectrum. For example, the light produced by the light source may be white light and the light source may be a fluorescent light.

According to some embodiments of the principles described herein, an electronic display is provided. In various embodiments, the electronic display is configured to emit modulated light beams as pixels of the electronic display. Further, in various examples, the emitted modulated light beams may be preferentially directed toward a viewing direction of the electronic display as a plurality of differently directed light beams. In some examples, the electronic display is a three-dimensional (3-D) electronic display (e.g., a glasses-free 3-D electronic display). Different ones of the modulated, differently directed light beams may correspond to different 'views' associated with the 3-D electronic display, according to various examples. The different views may provide a 'glasses free' (e.g., autostereoscopic) representation of information being displayed by the 3-D electronic display, for example.

Figure 4:
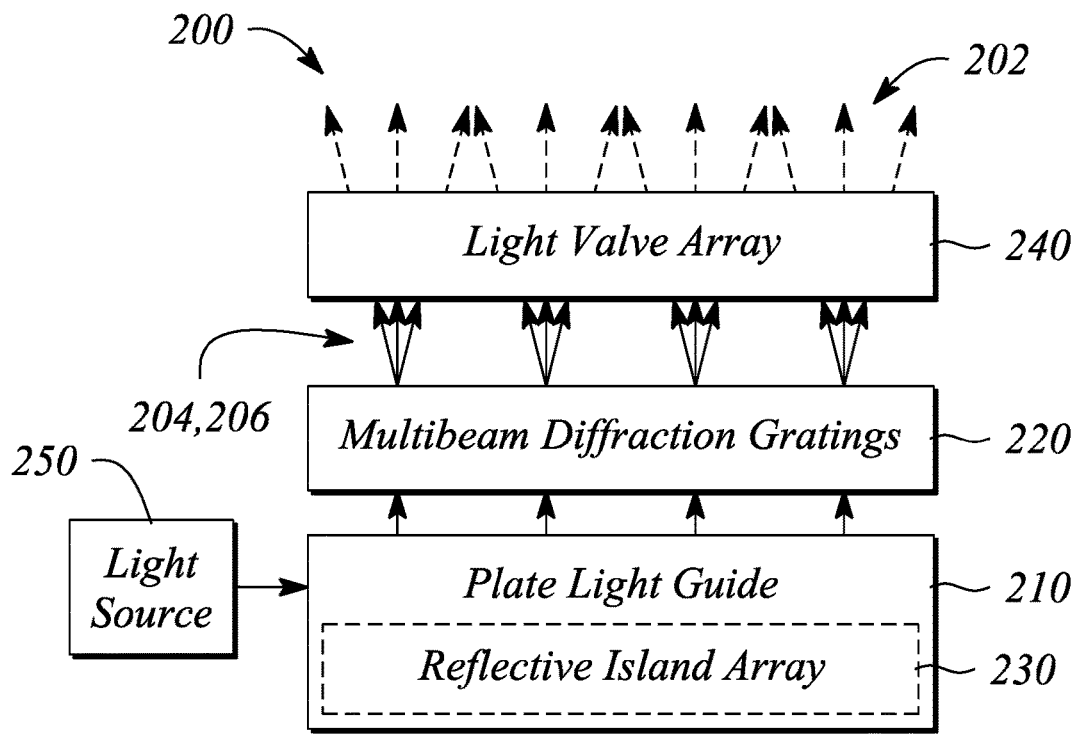
FIG. 4 illustrates a block diagram of an electronic display in an example, according to an embodiment consistent with the principles described herein.

FIG. 4 illustrates a block diagram of an electronic display 200 in an example, according to an embodiment consistent with the principles described herein. In particular, the electronic display 200 illustrated in FIG. 4 is a 3-D electronic display 200 (e.g., a 'glasses free' 3-D electronic display) configured to emit modulated light beams 202 representing pixels corresponding to different views of the 3-D electronic display 200. The emitted, modulated light beams 202 are illustrated as diverging (e.g., as opposed to converging) in FIG. 4 by way of example and not limitation.

The 3-D electronic display 200 illustrated in FIG. 4 includes a plate light guide 210 to guide light. The guided light in the plate light guide 210 is a source of the light that becomes the modulated light beams 202 emitted by the 3-D electronic display 200. According to some examples, the plate light guide 210 may be substantially similar to the light guide 110 described above with respect to unidirectional grating-based backlight 100. For example, the plate light guide 210 may be a slab optical waveguide that is a planar sheet of dielectric material configured to guide light by total internal reflection. The guided light may be guided at a non-zero propagation angle as a beam of light. Further, the guided light beam may be a collimated light beam, according to some embodiments.

The 3-D electronic display 200 illustrated in FIG. 4 further includes an array of multibeam diffraction gratings 220. In some examples, the multibeam diffraction gratings 220 may be substantially similar to the multibeam diffraction gratings 120 of the unidirectional grating-based backlight 100, described above. In particular, the multibeam diffraction gratings 220 of the array are configured to couple out a portion of the guided light as a plurality of primary light beams 204. Further, the multibeam diffraction grating 220 is configured to direct the primary light beams 204 in a corresponding plurality of different principal angular directions to form a light field.

Further, in some embodiments, the array of multibeam diffraction gratings 220 may include a chirped diffraction grating. In some examples, diffractive features (e.g., grooves, ridges, etc.) of the multibeam diffraction gratings 220 are curved diffractive features. For example, the curved diffractive features may include ridges or grooves that are curved (i.e., continuously curved or piece-wise curved) and spacings between the curved diffractive features that vary as a function of distance across the multibeam diffraction gratings 220 of the array.

As illustrated in FIG. 4, the 3-D electronic display 200 further includes an array of reflective islands 230. The reflective islands 230 are located within the plate light guide 210. In particular, the reflective islands 230 may be located between and spaced apart from a front surface and a back surface of the plate light guide 210, according to some embodiments. Further, the array of reflective islands 230 are co-located or aligned with (e.g., vertically stacked with) the array of multibeam diffraction gratings 220 such that each multibeam diffraction grating 220 has a corresponding reflective island 230. Each reflective island 230 is configured to reflectively redirect diffractively produced, secondary light beams from a corresponding multibeam diffraction grating 220. Further, the reflective islands 230 reflectively redirect the diffractively produced, secondary light beams. In turn, the multibeam diffraction gratings 220 are configured to also direct the reflectively redirected, secondary light beams out of the plate light guide 210 in the directions of the coupled-out primary light beam plurality. As a result, the formed light field includes both primary light beams 204 and reflectively redirected, secondary light beams 206, according to various embodiments. In some embodiments, a primary light beam 204 and a corresponding reflectively redirected, secondary light beam 206 are substantially co-directed (e.g., have similar principal angular directions) within the light field.

In some embodiments, the reflective island 230 of the array is substantially similar to the reflective island 130 described above with respect to the unidirectional grating-based backlight 100. For example, the reflective island 230 may comprise a metal island. Further, the reflective islands may be laterally (e.g., horizontally) aligned with corresponding multibeam diffraction gratings 220. In some embodiments, a size or extent of the reflective island 230 may be substantially similar to a size or extent of a corresponding multibeam diffraction grating 220. In addition, a spacing between the multibeam diffraction grating 220 and the aligned reflective island 230 may be given by equation (2), above.

In some embodiments, a reflectivity of the reflective islands 230 is modulated as a function of distance along the array. For example, the reflective island reflectivity may be modulated to gradually increase the reflectivity of individual ones of the reflective island 230 along a length of the array of reflective islands 230. Increasing the reflectivity may be employed to compensate for a loss of intensity of the guided light beam as a function of distance in the plate light guide 210, for example.

Figure 5:
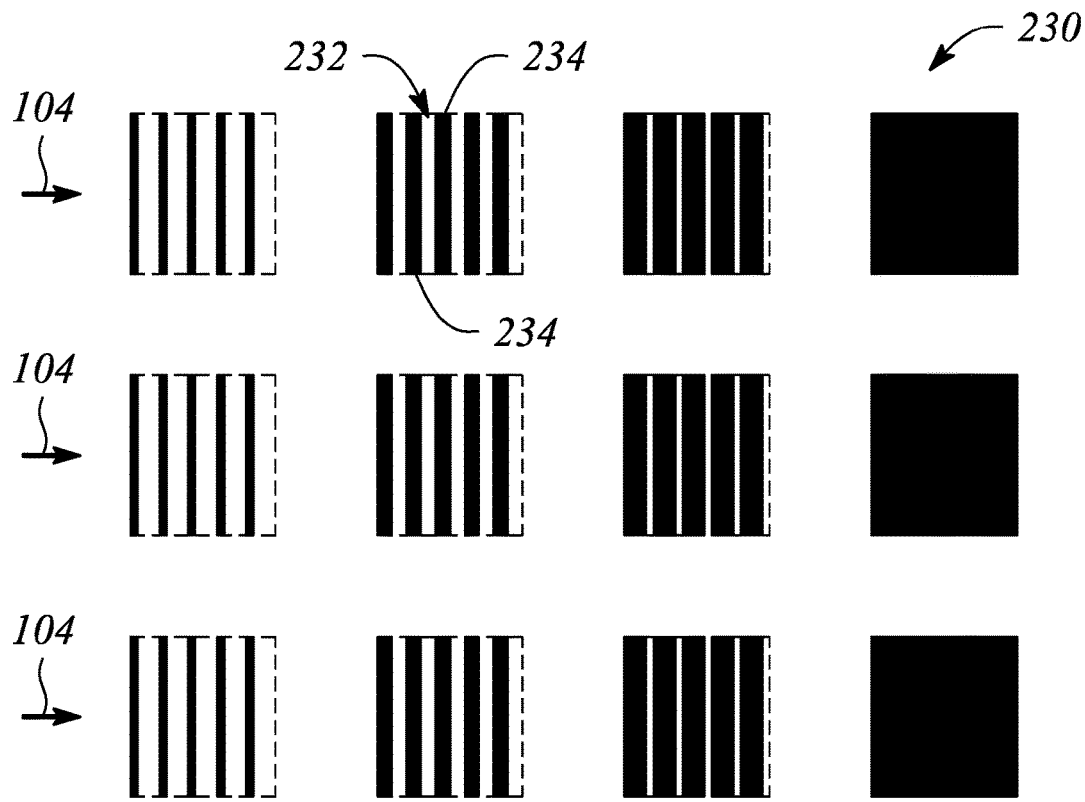
FIG. 5 illustrates a top view of an array of reflective islands in an example, according to an embodiment consistent with the principles described herein.

FIG. 5 illustrates a top view of an array of reflective islands 230 in an example, according to an embodiment consistent with the principles described herein. As illustrated in FIG. 5, the reflectivity of the reflective islands 230 is modulated as a function of distance (e.g., from left to right in FIG. 5) by gaps 232. In particular, the reflective islands 230 of the reflective island array comprise reflective strips 234 (e.g., reflective material or metal strips) separated by the gaps 232 (i.e., an absence of reflective material or metal). The reflectivity of a selected reflective island 230 is determined and thus modulated by a width of the gaps 232 relative to a width of the reflective strips 234 in the respective reflective island 230 in the direction of propagation of guided light (bold arrow 104). For example, the reflective islands 230 comprising more reflective surface of the reflective (e.g., metal) strips 234 than gaps 232 will have greater reflectivity than other reflective islands 230 in the array comprising less reflective surface (of the reflective strips 234) than gaps 232. FIG. 5 illustrates an increasing reflectivity with distance in the propagation direction 104 with an increasing width of the reflective strips 234 relative to the gaps 232. In another example (not illustrated), the reflectivity may be modulated by changing a respective number of the gaps and strips. In yet another example, the reflectivity modulation may be provided by changing a thickness or density of a layer of reflective material of the reflective islands 230 as a function of distance along the array (e.g., similar to the way half-silvered mirrors are formed). Any of a variety of other means of modulating the reflectivity may also be employed including, but not limited to, changing a number of layers of a DBR based mirror island, for example.

Referring again to FIG. 4, the 3-D electronic display 200 further includes a light valve array 240. The light valve array 240 includes a plurality of light valves configured to modulate the primary light beams 204 and the reflectively redirected, secondary light beams 206 coupled out of the plate light guide 210, according to various examples. In particular, the light valves of the light valve array 240 modulate the combined primary light beams 204 and the reflectively redirected, secondary light beams 206 to provide the modulated light beams 202. The modulated light beams 202 represent pixels of the 3-D electronic display 200. Moreover, different ones of the modulated light beams 202 may correspond to different views of the 3-D electronic display. In various examples, different types of light valves in the light valve array 240 may be employed including, but not limited to, one or more of liquid crystal (LC) light valves and electrophoretic light valves. Dashed lines are used in FIG. 4 to emphasize modulation of the modulated light beams 202, by way of example.

In some examples (e.g., as illustrated in FIG. 4), the 3-D electronic display 200 further includes a light source 250. The light source 250 is configured to provide light that propagates in the plate light guide 210 as the guided light. In particular, the guided light is light from the light source 250 that is coupled into an edge of the plate light guide 210, according to some examples. In some examples, the light source 250 is substantially similar to the light source described above with respect to the unidirectional grating-based backlight 100. For example, the light source 250 may include an LED of a particular color (e.g., red, green, blue) to provide monochromatic light or a broadband light source such as, but not limited to, a fluorescent light, to provide broadband light (e.g., white light).

Figure 6:
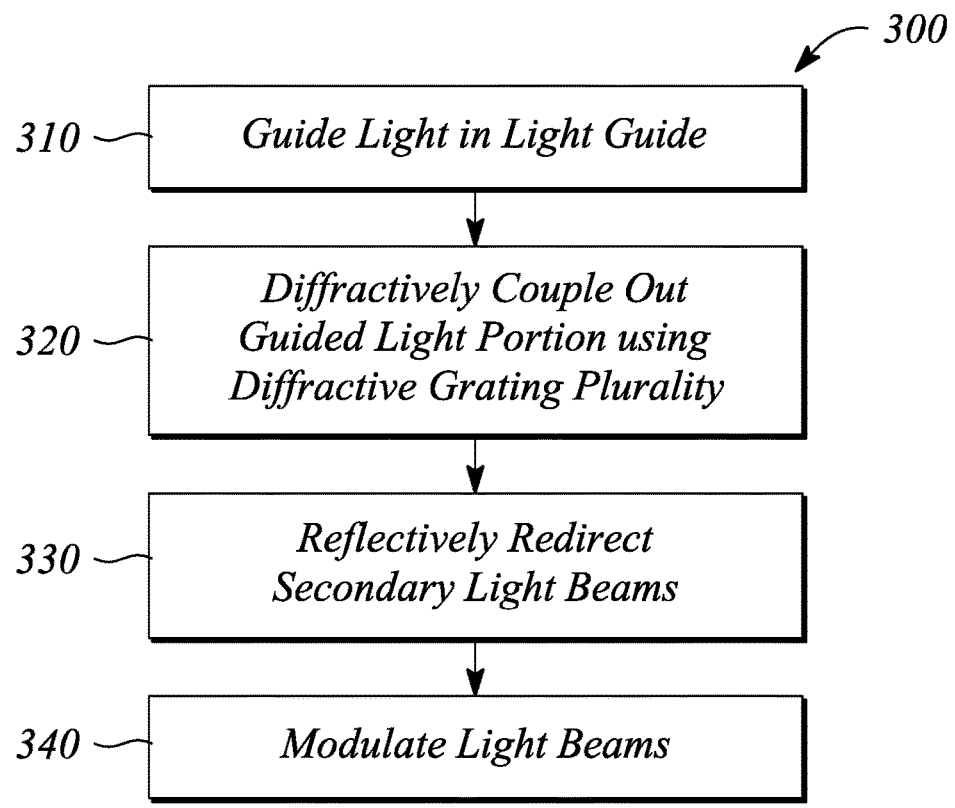
FIG. 6 illustrates a flow chart of a method of electronic display operation in an example, according to an embodiment consistent with the principles described herein.

According to some embodiments of the principles described herein, a method of electronic display operation is provided. FIG. 6 illustrates a flow chart of a method 300 of electronic display operation in an example, according to an embodiment consistent with the principles described herein. As illustrated in FIG. 6, the method 300 of electronic display operation comprises guiding 310 light in a light guide. In some embodiments, the light guide and the guided light may be substantially similar to the light guide 110 and the guided light beam 104, described above with respect to the unidirectional grating-based backlight 100. In particular, in some embodiments, the light guide may guide 310 the guided light according to total internal reflection as a beam (e.g., a collimated beam) of light. The light beam may be guided 310 at a non-zero propagation angle, for example. Further, the light guide may be a substantially planar dielectric optical waveguide (e.g., a plate light guide), in some embodiments.

The method 300 of electronic display operation further includes diffractively coupling out 320 a portion of the guided light using a plurality of diffraction gratings. In some embodiments, the diffraction gratings are multibeam diffraction gratings and diffractively coupling out 320 the guided light portion using the multibeam diffraction gratings produces a plurality of primary light beams directed out and away from the light guide surface. In particular, the primary light beams may be directed away from the light guide surface at different principal angular directions to form a light field, according to some embodiments. In some examples, the plurality of primary light beams is substantially similar to the plurality of primary light beams 102, 204 described above with respect to the unidirectional grating-based backlight 100 and the 3-D electronic display 200.

According to various examples, the multibeam diffraction grating is located at a surface of the light guide. For example, the multibeam diffraction grating may be formed in the surface of the light guide as grooves, ridges, etc. In other examples, the multibeam diffraction grating may include a film on the light guide surface. In some examples, the diffraction grating and more particularly the multibeam diffraction grating is substantially similar to the multibeam diffraction grating 120 described above with respect to the unidirectional grating-based backlight 100. In other examples, the diffraction gratings are located elsewhere including, but not limited to, within the light guide. According to some embodiments, the primary light beams forming the light field may correspond to pixels of the electronic display. In particular, the primary light beam plurality may correspond to pixels of different views of a three-dimensional (3-D) electronic display.

As illustrated in FIG. 6, the method 300 of electronic display operation further includes reflectively redirecting 330 secondary light beams in a direction of the coupled-out or emitted primary light beam plurality. The reflectively redirected 330 secondary light beams are directed out of (i.e., emitted from) the light guide and may combine with the primary light beams to add to the formed light field (e.g., to increase an intensity of the light field), for example. According to various embodiments, reflectively redirecting 330 the secondary light beams is performed using a reflective island. The secondary light beams are diffractively produced from another portion of the guided light and are directed toward the reflective island by the multibeam diffraction grating, according to various embodiments.

In some embodiments, the reflective island may be substantially similar to the reflective island 130 described above with respect to the unidirectional grating-based backlight 100. In particular, the reflective island is located in the light guide between and space apart from a front surface and a back surface of the light guide, according to some embodiments. Further, the reflective island may be a metal island comprising a reflective metal layer, for example. Moreover, the reflective island may be a member of an array of reflective islands spaced from and laterally aligned (e.g., vertically stacked) with an array of the multibeam diffraction gratings. In some examples, as discussed above, the array of reflective islands may have a modulated reflectivity of the reflective islands as a function of distance in the direction of propagation of the guided light in the light guide. Further, the reflectively redirected 330 secondary light beams may be substantially similar to the reflectively redirected secondary light beams 106, 206, described above with respect to the unidirectional grating-based backlight 100 and the 3-D electronic display 200.

In some examples, the method 300 of electronic display operation further includes modulating 340 the emitted primary light beams and the reflectively redirected 330 secondary light beams using a plurality of light valves. In particular, the formed light field comprising the emitted primary light beam plurality substantially combined with the corresponding emitted secondary light beam plurality is modulated 340 by passing through or otherwise interacting with a corresponding plurality of light valves. The modulated 340 primary and secondary light beams of the formed light field may form the pixels of the electronic display (e.g., the 3-D electronic display), according to some embodiments. For example, the modulated 340 primary and secondary light beams of the formed light field may provide a plurality of different views of the 3-D electronic display (e.g., a glasses-free, 3-D electronic display).

In some examples, the plurality of light valves used in modulating 340 the primary and secondary light beams is substantially similar to the light valve array 240 described above with respect to the 3-D electronic display 200. For example, the light valves may include liquid crystal light valves. In another example, the light valves may be another type of light valve including, but not limited to, one or both of an electrowetting light valve and an electrophoretic light valve, or combinations thereof with liquid crystal light valves or other light valve types.

Thus, there have been described examples of a unidirectional grating-based backlight, a 3-D electronic display and a method of electronic display operation that employ reflective redirection of diffractively produced secondary light beams. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A unidirectional grating-based backlight comprising:
   a light guide configured to guide a light beam at a non-zero propagation angle;
   a grating array including a plurality of spaced-apart diffraction gratings that are located at a surface of the light guide, a diffraction grating of the grating array being configured to diffractively couple out a portion of the guided light beam as a primary light beam and to direct the primary light beam away from the light guide surface at a predetermined principal angular direction, the diffraction grating further being configured to diffractively produce a secondary light beam and to direct the secondary light beam into the light guide; and
   an island array including a plurality of spaced-apart reflective islands located within the light guide that are spaced apart from the light guide surface and spaced apart from an opposite surface of the light guide, a reflective island of the island array extending within a plane, the guided light beam configured to propagate from a first side of the plane to a second side of the plane opposite the first side, the reflective island being configured to reflectively redirect the secondary light beam out of the light guide in a direction of the primary light beam.

2. The unidirectional grating-based backlight of claim 1, wherein the diffraction grating comprises a multibeam diffraction grating configured to couple out the portion of the guided light beam as a plurality of primary light beams, the primary light beams of the primary light beam plurality having different principal angular directions from one another.

3. The unidirectional grating-based backlight of claim 2, wherein the multibeam diffraction grating comprises a chirped diffraction grating.

4. The unidirectional grating-based backlight of claim 2, wherein the multibeam diffraction grating comprises one of curved grooves and curved ridges that are spaced apart from one another.

5. The unidirectional grating-based backlight of claim 2, wherein the different principal angular directions of the primary light beams are configured to form a light field configured to provide pixels corresponding to different views of a three dimensional (3-D) electronic display.

6. The unidirectional grating-based backlight of claim 1, wherein the reflective island is a metal island comprising a reflective metal layer.

7. The unidirectional grating-based backlight of claim 1, wherein the light guide is a plate light guide, and wherein the reflective island is aligned with the diffraction grating.

8. The unidirectional grating-based backlight of claim 1, wherein an extent of the reflective island is about equal to an extent of the diffraction grating, and wherein a distance between the diffraction grating and the reflective island is about equal to one half of a grating pitch multiplied by a tangent of the non-zero propagation angle of the guided light beam, the grating pitch being a lateral spacing at the light guide surface between the diffraction grating and an adjacent diffraction grating.

9. An electronic display comprising the unidirectional grating-based backlight of claim 1, wherein a pixel of the electronic display comprises the primary light beam in combination with the reflectively redirected, secondary light beam.

10. The electronic display of claim 9, further comprising a light valve to modulate the combined primary and reflectively redirected, secondary light beams, the light valve being adjacent to the light guide surface that includes the diffraction grating.

11. A three-dimensional (3-D) electronic display comprising:
    a plate light guide to guide light as guided light;
    a grating array including a plurality of spaced-apart multibeam diffraction gratings, a multibeam diffraction grating of the grating array being configured to diffractively couple out a portion of the guided light as a plurality of primary light beams directed in a corresponding plurality of different principal angular directions to form a light field, the multibeam diffraction grating further being configured to diffractively produce a plurality of secondary light beams and to direct the secondary light beam plurality into the plate light guide;
    an island array including a plurality of spaced-apart reflective islands within the plate light guide aligned with the multibeam diffraction gratings of the grating array, the reflective islands of the island array being spaced apart from the light guide surface and spaced apart from an opposite surface of the light guide, the reflective islands of the island array extending within a plane, the guided light configured to propagate between adjacent reflective islands of the island array from a first side of the plane to a second side of the plane opposite the first side, a reflective island of the island array being configured to reflectively redirect the secondary light beam plurality from an aligned multibeam diffraction grating of the grating array in a direction of the primary light beam plurality; and
    a light valve array configured to modulate the primary light beams and the reflectively redirected, secondary light beams, the modulated light beams representing pixels corresponding to different views of the 3-D electronic display.

12. The 3-D electronic display of claim 11, wherein the multibeam diffraction grating of the grating array comprises a chirped diffraction grating having curved diffractive features.

13. The 3-D electronic display of claim 11, wherein the plate light guide is configured to guide light as a collimated light beam at a non-zero propagation angle.

14. The 3-D electronic display of claim 11, wherein the reflective islands comprise a metal island.

15. The 3-D electronic display of claim 11, wherein a reflectivity of the reflective islands is modulated as a function of distance along the island array.

16. The 3-D electronic display of claim 15, wherein the reflective islands of the island array comprise reflective strips separated by gaps, the reflectivity of the reflective islands being modulated by a width of the gaps relative to a width of the reflective strips.

17. The 3-D electronic display of claim 11, wherein the light valve array comprises a plurality of liquid crystal light valves.

18. A method of electronic display operation, the method comprising:
    guiding a light beam in a light guide at a non-zero propagation angle;

diffractively coupling out a portion of the guided light beam using a grating array that includes a plurality of spaced-apart multibeam diffraction gratings, a multibeam diffraction grating of the grating array to produce a plurality of primary light beams directed away from a surface of the light guide at different principal angular directions to form a light field;

diffractively producing a plurality of secondary light beams with the multibeam diffraction grating;

directing the plurality of secondary light beams toward a reflective island, the reflective island being included in an island array of spaced-apart reflective islands within the light guide that are spaced apart from a front surface of the light guide and spaced apart from a back surface of the light guide, the island array extending within a plane, the guided light beam propagating from a first side of the plane to a second side of the plane opposite the first side; and reflectively redirecting the secondary light beams out of the light guide in a direction of the primary light beam plurality using the reflective island.

19. The method of electronic display operation of claim 18, further comprising modulating the primary light beams and the reflectively redirected, secondary light beams using a plurality of light valves, the modulated primary and secondary light beams forming pixels corresponding to different views of a three-dimensional (3-D) electronic display.

\* \* \* \* \*